US008261965B2

(12) United States Patent
Cyphers et al.

(10) Patent No.: US 8,261,965 B2
(45) Date of Patent: Sep. 11, 2012

(54) LOCKING MECHANISM FOR MAILBOXES

(75) Inventors: Thomas J. Cyphers, Atlanta, GA (US); Reinhardt F. Cyphers, Newnan, GA (US)

(73) Assignee: Addresses of Distinction, Atlanta, GA (US)

( * ) Notice: Subject to any disclaimer, the term of this patent is extended or adjusted under 35 U.S.C. 154(b) by 0 days.

(21) Appl. No.: 12/773,828

(22) Filed: May 4, 2010

(65) Prior Publication Data

US 2010/0294007 A1 Nov. 25, 2010

Related U.S. Application Data

(60) Provisional application No. 61/175,141, filed on May 4, 2009.

(51) Int. Cl.
*B65G 11/04* (2006.01)

(52) U.S. Cl. ............................... 232/45; 232/54; 109/66

(58) Field of Classification Search .................... 232/45, 232/54, 44, 19, 17; 70/141, 101, 162; 220/826; 49/394; 29/401.1; 109/66

See application file for complete search history.

(56) References Cited

U.S. PATENT DOCUMENTS

| | | | | |
|---|---|---|---|---|
| 449,372 | A * | 3/1891 | Markell | 232/19 |
| 450,379 | A * | 4/1891 | Sinclaire | 232/51 |
| 533,518 | A * | 2/1895 | Witte | 232/54 |
| 626,251 | A * | 6/1899 | Teevan et al. | 232/54 |
| 722,323 | A * | 3/1903 | Parker | 232/54 |
| 1,048,409 | A * | 12/1912 | Hoskins | 232/54 |
| 1,458,836 | A * | 6/1923 | McDowell | 232/35 |
| 2,437,319 | A * | 3/1948 | Gable et al. | 232/45 |
| 2,595,535 | A * | 5/1952 | Nowakowski | 232/45 |
| 4,869,425 | A * | 9/1989 | Chiou | 232/17 |
| 7,070,090 | B2 * | 7/2006 | Ranen | 232/45 |
| 7,428,980 | B2 * | 9/2008 | Irwin et al. | 232/45 |
| 7,931,189 | B2 * | 4/2011 | Kalenburg | 232/45 |

* cited by examiner

*Primary Examiner* — William L. Miller
(74) *Attorney, Agent, or Firm* — Ballard Spahr LLP

(57) ABSTRACT

An access door for a locking mailbox is provided having a mail slot configured for the receipt of items, such as letters, which can be covered by a rotatable mail slot door. The locking mailbox can also have a lock configured to selectively lock the access door to a housing of the pre-existing or new mailbox and, optionally, a theft deterrent device positioned adjacent the mail slot that projects inwardly into the housing of the mailbox when the door of the mailbox is positioned in a closed position.

11 Claims, 6 Drawing Sheets

LOCKING MECHANISM FOR MAILBOXES

FIELD OF THE INVENTION

This invention relates generally to locking mechanisms. In particular, the invention relates to a locking mechanism for mailboxes to deter or prevent theft therefrom.

BACKGROUND OF THE INVENTION

There are millions of mailboxes in use around the world, the majority of which are non-locking mailboxes. Mail delivered to a mailbox often includes sensitive information, such as social security numbers, bank statements with account numbers, credit card statements, tax information and the like which is advantageous to identity thieves. Mailbox security is thus an important concern for protection against theft of mail, including mail containing personal identifying information. Mail delivered by a postal carrier to a mailbox is often left unguarded for hours or even days at a time. Recently, increases in theft and overall concerns of personal security have drawn into question the wisdom of relying on non-locking mailboxes for mail delivery. Further, many mailboxes are susceptible to thievery because of their isolated and secluded locations.

Providing a locking mechanism on mailboxes provides a partial solution. A lock helps to ensure that mail and other articles are securely stored and that access is limited. Therefore, there is a need for a mailbox locking mechanism to deter or prevent the theft of mail from mailboxes.

SUMMARY OF THE INVENTION

According to various aspects, the present invention is a locking mechanism for a mailbox. In one aspect, the locking mechanism can comprise at least one of an access door, a mail slot door, and a lock. In one exemplary embodiment, the locking mechanism can further comprise a theft deterrent device having a plurality of teeth defined therein. In one aspect, the locking mechanism can be configured as a replacement door for a pre-existing, non-locking mailbox, in order to convert the pre-existing, non-locking mailbox into a locking mailbox. In another aspect, the locking mechanism can be configured for attachment to a new mailbox.

According to one embodiment, the access door can be sized and shaped to matingly engage the opening of a housing of a mailbox. In one aspect, the access door can be hingeably connected to the mailbox and can have a rear side that faces an interior cavity formed in the housing of a mailbox when the access door is in a closed position.

In another aspect, the access door can define a mail slot that extends therethrough the access door. In still another aspect, the mail slot can be sized and shaped for acceptance of conventional mail, such as letters while also preventing the insertion of at least a portion of a person's hand and/or arm therethrough the slot.

In one aspect, the mail slot door can be hingeably connected to the rear side of the access door. In another aspect, the mail slot door can be rotated about and between a closed position, in which the mail slot of the access door is covered or blocked, and an open position, in which the mail slot of the access door is not covered or blocked.

The lock, according to one aspect, can be configured for locking the access door to the housing when the access door is in the closed position. In another aspect, a latch of the lock can be attached to the access door, and a lock catch can be attached to the interior of the housing of the mailbox. In this aspect, a user can selectively urge the latch to selectively engage the lock catch, which locks the access door relative to the housing.

In one aspect, the theft deterrent device can be positioned on the rear side of the access door below the mail slot defined therein the access door. In another aspect, the theft deterrent device can extend away from the rear side of the access door at an acute angle. In one aspect, a distal end of the theft deterrent device can define a plurality of teeth configured to engage a hand and/or an arm of a person that inserts his hand and/or arm through the mail slot a predetermined distance.

In use, the locking mechanism can be used to convert a pre-existing, non-locking mailbox to a locking mailbox by removing the access door of the pre-existing mailbox and replacing it with the locking mechanism of the current application. Optionally, the locking mechanism can be used in the construction of a new mailbox to create a locking mailbox.

Additional advantages of the invention will be set forth in part in the description that follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate (one) several embodiment(s) of the invention and together with the description, serve to explain the principles of the invention.

DESCRIPTION OF THE PREFERRED EMBODIMENTS

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such can vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "mailbox" can include two or more such mailboxes unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

Reference will now be made in detail to the present preferred embodiment(s) of the invention, examples of which are illustrated in the accompanying drawings. Wherever possible, the same reference numbers are used throughout the drawings to refer to the same or like parts.

Figure 1:
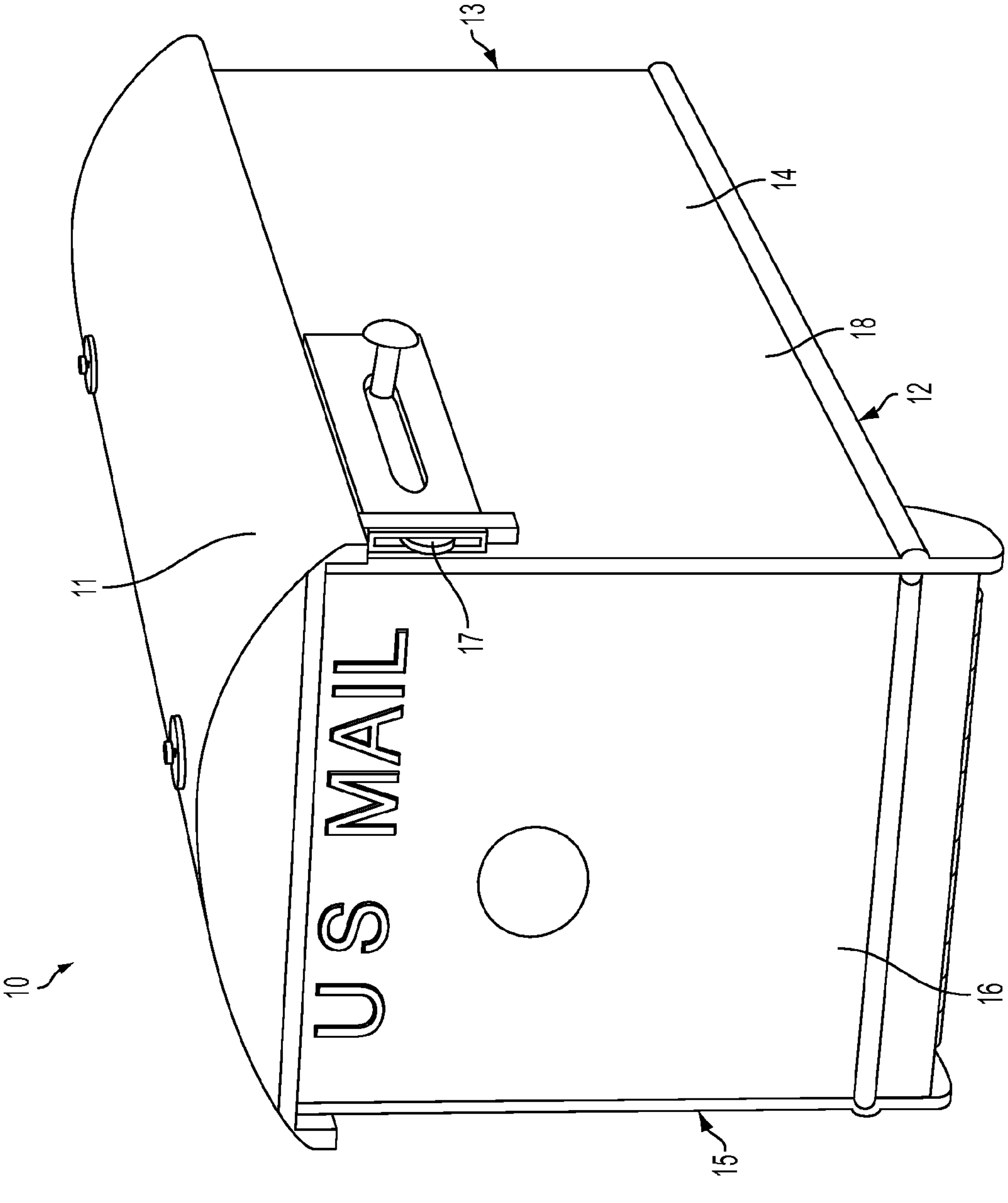
FIG. 1 is a conventional non-locking mailbox.

FIG. 1 illustrates a conventional non-locking mailbox 10, having an upper surface 11, a lower surface 12, a back wall 13, two sidewalls 14, 15, and a hinged non-locking access door 16. The upper and lower surfaces, the back wall and sidewalls are arranged to form a housing 18 having an opening. The opening can allow access to an interior cavity 19 of the mailbox. Conventionally, the hinged non-locking access door can operatively engage the housing to selectively open and close the interior cavity. In operation, in order to access the interior cavity of the mailbox 10 for the insertion or removal of mail therefrom, a user, such as a letter carrier, can hingedly open the non-locking access door 16. Conventional mailboxes typically can also have a flag 17 mounted to the outside of the housing 18 with fasteners such as screws. The flag can be selectively rotated about and between a lowered positioned and a raised position to signal to a letter carrier that mail is in the mailbox.

Figure 2:
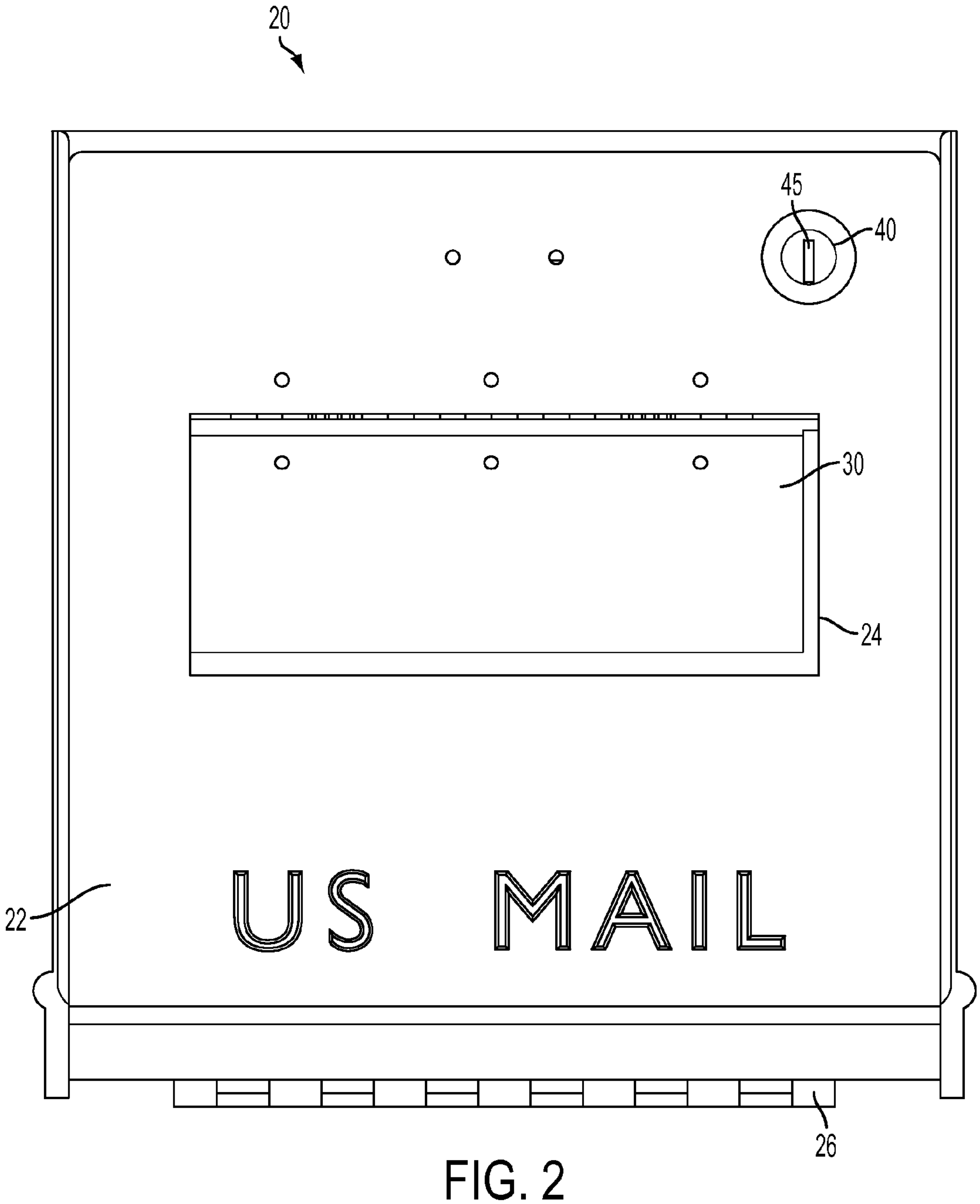
FIG. 2 is a front elevational view of a locking mechanism of the current application, according to one aspect.
Figure 3:
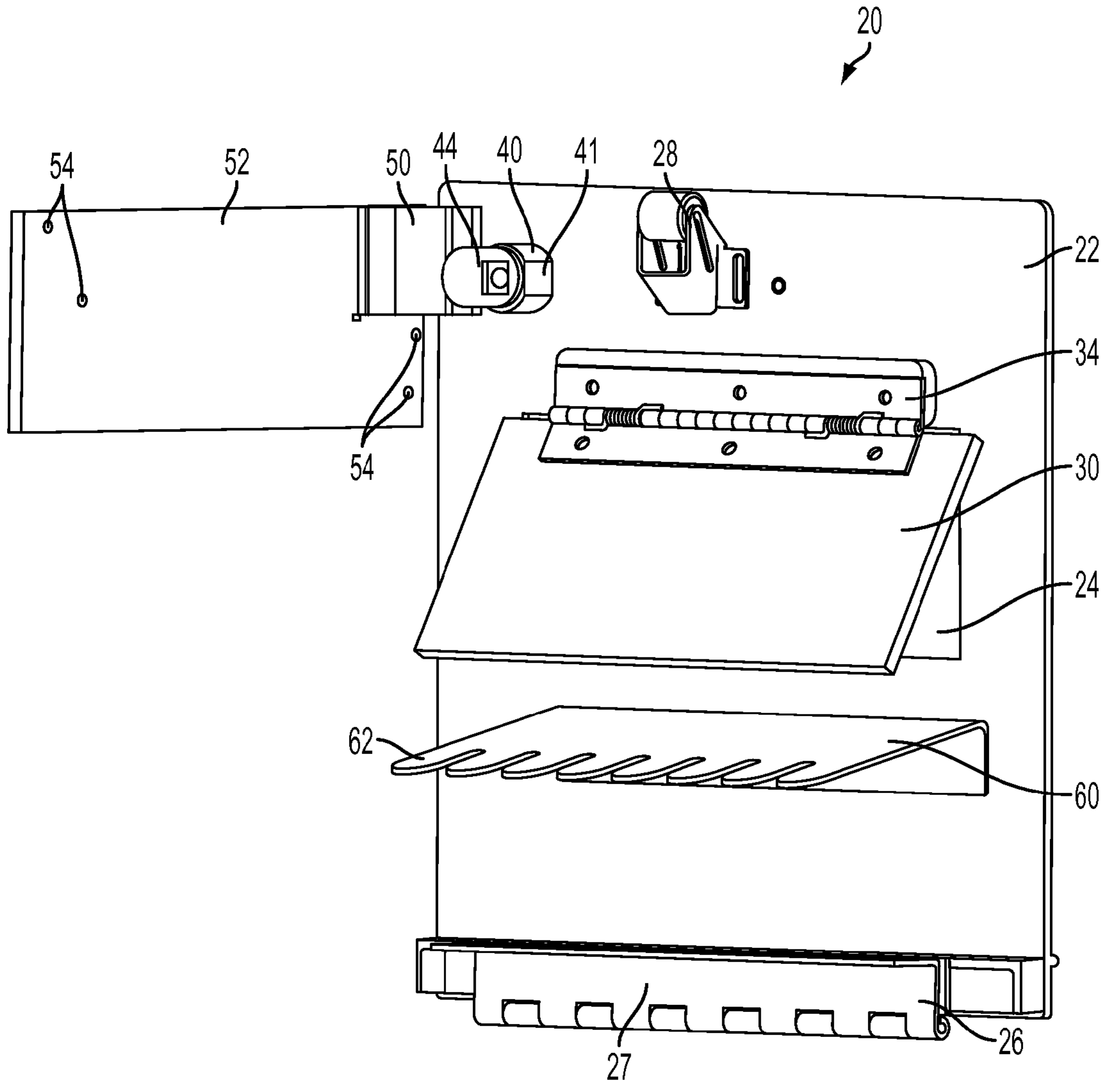
FIG. 3 is a rear perspective view of the locking mechanism of FIG. 2, according to one aspect.

A locking mechanism 20 for a mailbox is provided, according to various aspects of the present application. In one embodiment, as shown in FIGS. 2 and 3, the locking mechanism 20 can comprise at least one of an access door 22, a mail slot door 30, and a lock 40. In one exemplary embodiment, illustrated in FIG. 3, the locking mechanism can further comprise a theft deterrent device 60.

One embodiment of the access door is illustrated in FIG. 2. In one aspect, the access door can be sized and shaped to matingly engage the opening of the housing 18 of a mailbox 10. In another aspect, the access door 22 can be substantially rectangular. It is contemplated however, that the access door can be other shapes, such as substantially square, substantially circular, or any other shape to complement the size and shape of the opening of the housing of the mailbox. In another aspect, the access door can be sized and shaped to engage the opening of the housing of a mailbox in order to restrict water and/or other contaminants from accessing the interior cavity 19 of the mailbox. In still another aspect, the access door 22 can have a rear side 21 that faces the interior cavity of the mailbox when the access door is hingeably connected to a mailbox and is positioned in a closed position, as will be described more fully below. Similarly, the access door has a front side 23 that faces away from the interior cavity of the mailbox when the access door is hingeably connected to a mailbox and is positioned in the closed position.

In another aspect, the access door can define a mail slot 24 that extends from the front side to the rear side of the access door 22. In one aspect, the mail slot can be substantially rectangular, though other shapes of the mail slot are also contemplated. In another aspect, the mail slot can be configured to allow at least some conventional mail items, such as letters, to be inserted therethrough the access door. In still another aspect, the mail slot can be sized and shaped such that at least some items, such as letters, can be inserted therethrough the access door. However, it is contemplated that the relative size of the mail slot will be minimized to that so that at least a portion of a person's hand and/or arm cannot be inserted therethrough.

In one aspect, the access door can comprise a door hinge 26. In another aspect, the door hinge can be a conventional hinge that hingeably connects the access door to the housing 18 of a mailbox 10. When the access door is hingeably connected to the housing, the access door 22 can be moved about and between a closed position, in which access to the interior cavity 19 of the mailbox is restricted, and an open position, in which access to the interior cavity of the mailbox is not restricted. In another aspect, a first element 27 of the door hinge can be fixedly attached to the lower surface 12 of the mailbox. However, as one skilled in the art will appreciate, it is also contemplated that the first element of the door hinge can be attached to either of the sidewalls 14, 15 or to the upper surface 11 of the mailbox. In still another aspect, a second element 29 of the door hinge 26 can be fixedly attached to the rear side of the access door 22 in a complementary position to the first element (i.e., if the first element 27 is attached to the lower surface of the mailbox, then the second element 29 can be attached to a lower portion of the rear side of the access door). A hinge pin, as known in the art, can rotatably couple the first element and the second element of the door hinge 26.

In another aspect, the first element of the door hinge can be fixedly attached to the mailbox 10 with conventional fasteners, such as screws, bolts, rivets, and the like. In still another aspect, the second element of the door hinge 26 can be fixedly attached to the access door with conventional fasteners, such as screws, bolts, rivets, and the like. It is also contemplated that the first and/or second elements of the door hinge can be fixedly attached to the mailbox or the access door 22 with other methods, such as, for example and without limitation, welding, adhesives, pressure fitting, and the like.

In another aspect, the access door 22 can further comprise a conventional catch assembly 28 fixedly attached to the rear side 21 of the access door. When the access door has been rotatably attached to a mailbox and placed in the closed position, in one aspect, the catch assembly can apply pressure onto a complementary portion of the housing 18 of the mailbox to help maintain the access door in the closed position. In one aspect, the catch assembly can be a catch roller assembly, as illustrated in FIG. 3. In other aspects, it is contemplated that the catch assembly can comprise other types of catch assemblies, such as a magnetic catch assembly and the like.

In still another aspect, not illustrated, the access door 22 can further comprise a conventional thumb latch. In this aspect, the thumb latch can be positioned on the front side 23 of the access door and can provide a user of the mailbox a convenient means for engaging the access door.

Figure 4:
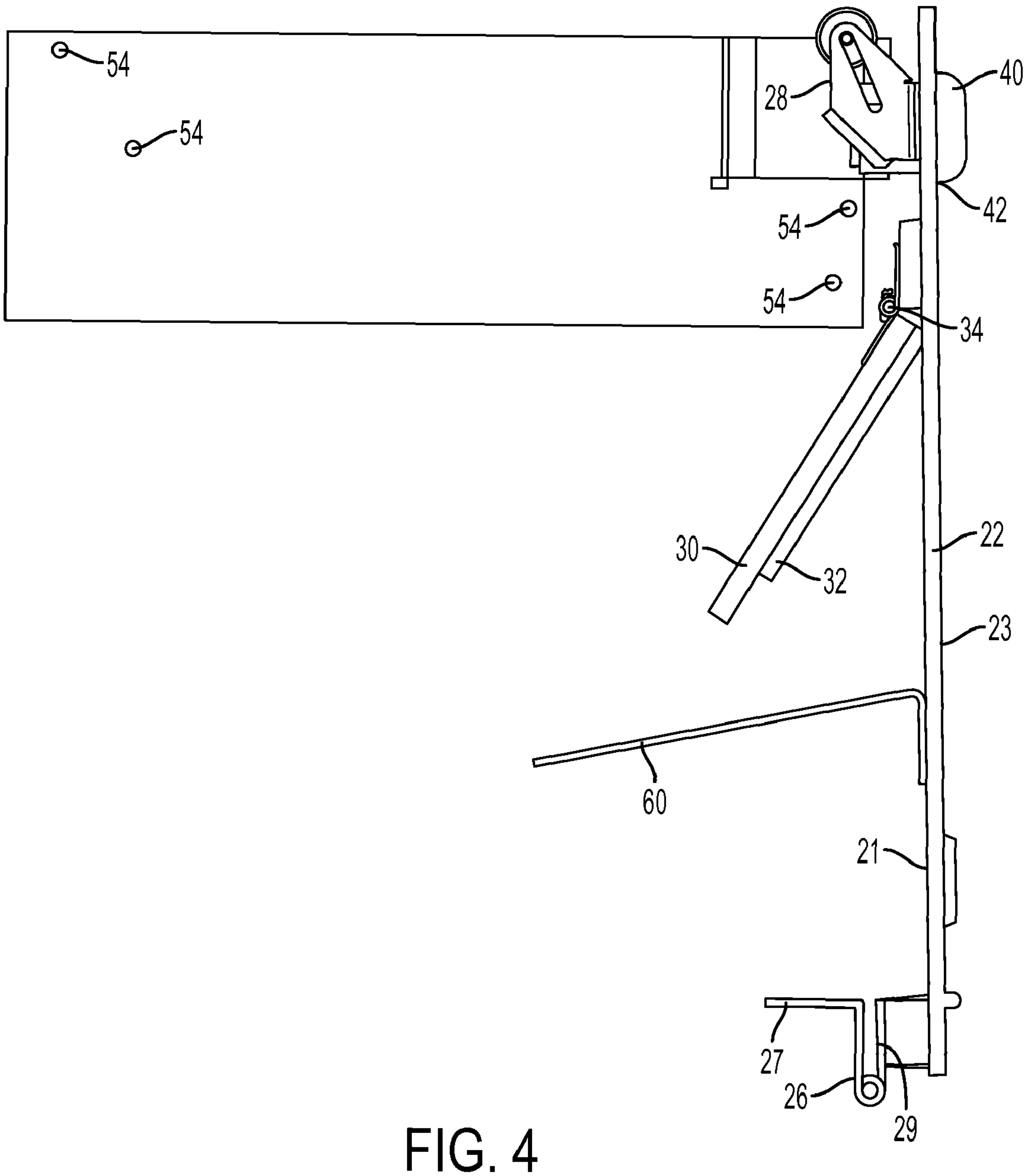
FIG. 4 is a side elevational view of the locking mechanism of FIG. 2, according to one aspect.

The mail slot door 30 is illustrated in FIGS. 2-4, according to various aspects. In one aspect, a mail slot hinge 34 can hingeably connect the mail slot door to the rear side 21 of the access door 22. In another aspect, the mail slot door can be rotated about and between a closed position, in which the mail slot 24 of the access door is covered or blocked, and an open position, in which the mail slot of the access door is not covered or blocked. In another aspect, the mail slot door can be sized larger than the mail slot to prevent the mail slot door 30 from moving through the mail slot. In still another aspect, the mail slot door can have a raised portion 32 configured to fit therein the mail slot 24 when the mail slot door is in the closed position.

In another aspect, the mail slot door 30 can be a self-closing mail slot door. In one aspect, the mail slot hinge 34 can be a spring-loaded hinge configured to urge the mail slot door into the closed position. In another aspect, a counterweight can be positioned on a portion of the mail slot door 30 such that the counterweight can urge the mail slot door into the closed position. In still another aspect, a gas spring can be coupled to the rear side of the access door 22 and a portion of the mail slot door in order to urge the mail slot door into the closed position and/or limit the speed at which the mail slot door can move to the closed position. In another aspect, the mail slot hinge 34 can comprise a combination of a spring-loaded hinge, a counterweight, and/or a gas spring, as described above.

FIGS. 2-4 illustrate the lock 40, in accordance with one embodiment of the present application. In one aspect, the lock comprises a locking tumbler 41 which is installable in the access door 22 and defines a key slot 45 configured for engaging a key. In another aspect, the lock 40 can be installed by fitting the locking tumbler 41 through a fitted opening defined therein the access door sized to receive an outside barrel 46 of the locking tumbler and sliding the locking tumbler into the opening until the inside edge of a lock facing 42 engages the front side 23 of the access door. In still another aspect, the lock 40 can be fastened into place by tightening a retaining bolt or similar fastener, such as a retaining clip or fastener assembly on the rear side of the access door. In another aspect, the locking tumbler 41 can be rotatably coupled to a latch 44, which can be configured to lock the access door 22 of the mailbox 10 when the access door is installed on a mailbox and when the access door is in the closed position and the lock is engaged, as will be described more fully below. In another aspect, the latch 44 can be selectively rotated about and between a locked and an unlocked position, while the outside barrel 46 of the locking tumbler remains fixed in place in the access door of the mailbox 10.

In one aspect, the lock 40 further comprises a lock catch 50 installed on the inside of the housing 18 of the mailbox. In another aspect, the lock catch can be fixedly attached to the inside of the housing in a position such that when the access door 22 is attached to the housing of the mailbox and in the closed position, the latch 44 of the lock can selectively engage the lock catch. In this aspect, when a key is inserted into the key slot 45 and rotated to the locked position, the latch is also rotated to the locked position. In the locked position, the latch can engage the lock catch 50, thereby preventing the access door 22 of the mailbox from being opened. Similarly, when a key is inserted into the key slot and rotated to the unlocked position, the latch is also rotated to the unlocked position. In the unlocked position, the latch 44 does not engage the lock catch, thereby allowing the access door of the mailbox to be opened. In still another aspect, it is contemplated that the lock catch can be positioned at any complementary location thereon the inside of the housing 18 of the mailbox (for instance, the upper surface 11), which would allow for the complementary selective engagement of the lock catch 50 and the latch 44.

In one aspect, the lock catch 50 can be fixedly attached to a lock plate 52. In another aspect, the lock plate can define a plurality of mounting bores 54 and can be sized so that the lock catch 50 is in a desired position when at least two bores of the plurality of mounting bores of the lock plate are substantially co-axially aligned with at least two bores of the pre-existing bores in a pre-existing mailbox 10, as will be described more fully below. In another aspect, the lock plate can be fixedly attached to the housing 18 of a mailbox by inserting a fastener, such as a screw, bolt, rivet, and the like through the housing and at least a portion of the plurality of mounting bores of the lock plate 52. It is also contemplated that the lock plate can be fixedly attached to the housing 18 with other conventional attachment methods, such as, for example and without limitation, welding, adhesives, pressure fitting, and the like.

It is of course contemplated that the lock 40 can be another type of lock, such as, for example and without limitation, a cylinder lock, a key lock, a combination lock, a radio frequency identification lock, a remote access lock and the like. In these aspects, one skilled in the art will appreciate that the latch 44, lock catch 50, and other components of the lock 40 described above can be altered as necessary so that a user can selectively secure the access door 22 to the housing.

Optionally, although reference is made herein to the latch 44 of the lock being coupled to the access door 22, and the lock catch being coupled to the housing of the mailbox, it is contemplated that the lock catch could be coupled to the access door 22 and the latch could be coupled to the housing. For example, the locking tumbler 41 could be fitted through an opening defined therein a sidewall 14, 15 of the housing, and the lock catch could be fixedly attached to the access door. In this example, the locking tumbler can be rotatably coupled to the latch 44 so that the latch can selectively engage the catch of the access door, thereby selectively locking the access door to the housing 18.

One embodiment of the theft deterrent device 60 is exemplarily illustrated in FIGS. 3 and 4. In one aspect, the theft deterrent device can be positioned on the rear side 21 of the access door 22 below the mail slot 24 defined therein the access door. In another aspect, the theft deterrent device can extend outwardly away from the rear side of the access door at an acute angle. In still another aspect, the theft deterrent device can extend away from the rear side of the access door at an angle substantially perpendicular to the access door. In one aspect, a distal edged of the theft deterrent device 60 can define a plurality of teeth 62. In other aspects, the plurality of teeth can be rounded in shape, as illustrated in FIG. 3, however, the plurality of teeth can also be pointed, or any another shape.

In a further aspect, the distal edge of the theft deterrent device 60 can extend a predetermined distance from the rear side of the access door. In one aspect, the theft deterrent device can extend a predetermined distance from the rear side of the access door so that it can deter a user from accessing mail or other items contained in the inner cavity 19 of the housing. For example, the theft deterrent device can extend about one inch, two inches, three inches, four inches, five inches, six inches, seven inches, eight inches or more, or any distance therebetween, from the rear side 21 of the access door 22 into the interior cavity of the mailbox when the access door is positioned in the closed position. In another aspect, the distal edge of the theft deterrent device 60 can be positioned a predetermined distance above the lower surface of the cavity of the housing when the access door is positioned in the closed position. In one aspect, the theft deterrent device can also be configured to allow mail and/or other items inserted through the mail slot of the access door to slide over the theft deterrent device and drop onto the lower surface 12 of the housing or onto any item already in the interior cavity 19 of the mailbox. In still another aspect, the theft deterrent device 60 can be configured such that at least a portion of the plurality of teeth 62 of the theft deterrent device can engage portions of the hand and/or arm of a person that attempts to retrieve mail from the interior cavity of the mailbox by inserting his hand and/or arm through the mail slot 24 of the access door 22.

In another aspect, it is contemplated that the theft deterrent device 60 can be coupled to the access door 22 and/or the housing 18 of the mailbox such that when the access door is unlocked and rotatably opened, the theft deterrent device can move so that a person retrieving the mail does not engage the plurality of teeth of the theft deterrent device. For example, the plurality of teeth 62 can be rotated towards rear side 21 of the access door 22 so that, when a user is accessing the interior cavity 19 of the mailbox by opening the access door, accidentally engaging the plurality of teeth of the theft deterrent device would be more difficult. In this aspect, it is contemplated that the distal edge of the theft deterrent device can be rotated downwardly until at least a portion of the distal edge is positioned adjacent to or in contact with the rear side of the access door.

It is also contemplated that the theft deterrent device can be moved when the mail slot door 30 is in the closed position. Thus, when the mail slot door is open, the theft deterrent device 60 would be in a non-collapsed position and ready to engage someone attempting to retrieve mail by inserting his hand and/or arm through the mail slot 24 of the access door.

Still with reference to FIG. 3, a locking mechanism 20 can be assembled to comprise any or all of the components as described above. In one aspect, the mail slot door 30 can be hingedly connected to the rear side 21 of the access door 22 and positioned to cover the mail slot 24 of the access door. The catch assembly 28 can be fixedly attached to the rear side 21 of the access door in a position to engage the housing 18 of a mailbox when the access door is in a closed position. In another aspect, the theft deterrent device 60, if present, can be positioned on the rear side 21 of the access door below the mail slot of the access door. In still another aspect, the lock 40 can be installed therein the access door 22 by inserting the locking tumbler 41 through the fitted opening defined therein the access door, sliding the locking tumbler into the opening until the inside edge of the lock facing 42 engages the front side 23 of the access door, and securing it in place.

In one embodiment, the locking mechanism 20, as assembled above, can be coupled to the housing 18 of a new mailbox by fixedly attaching the first element 27 of the door hinge 26 to an inside portion of the housing near a longitudinal edge of the upper surface 11, the lower surface 12, or the side walls 14, 15. In this embodiment, the second element 29 of the door hinge can be fixedly attached to the rear side 21 of the access door 22 in a complementary position to the first element. The hinge pin can be inserted between the first and second elements of the door hinge to couple them together, thereby permitting the access door 22 to be selectively rotated about and between the open and the closed positions. In another aspect, the lock catch 50 can be positioned on the interior of the housing 18 of the mailbox in order to engage the latch 44 and allow the mailbox to be locked when the access door is in the closed position.

Figure 5:
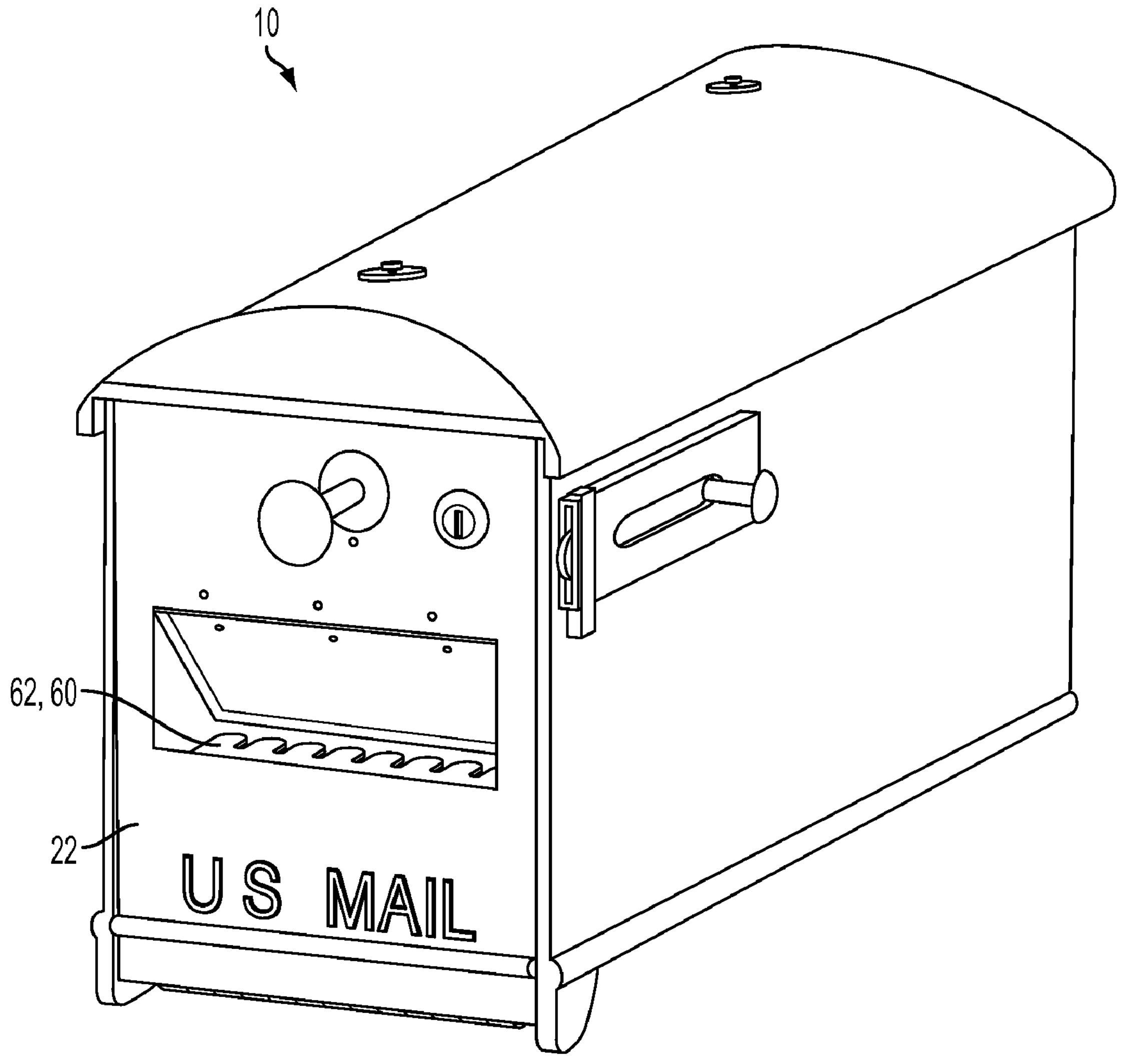
FIG. 5 is a perspective view of the mechanism of FIG. 2 coupled to a pre-existing mailbox, according to one aspect.
Figure 6:
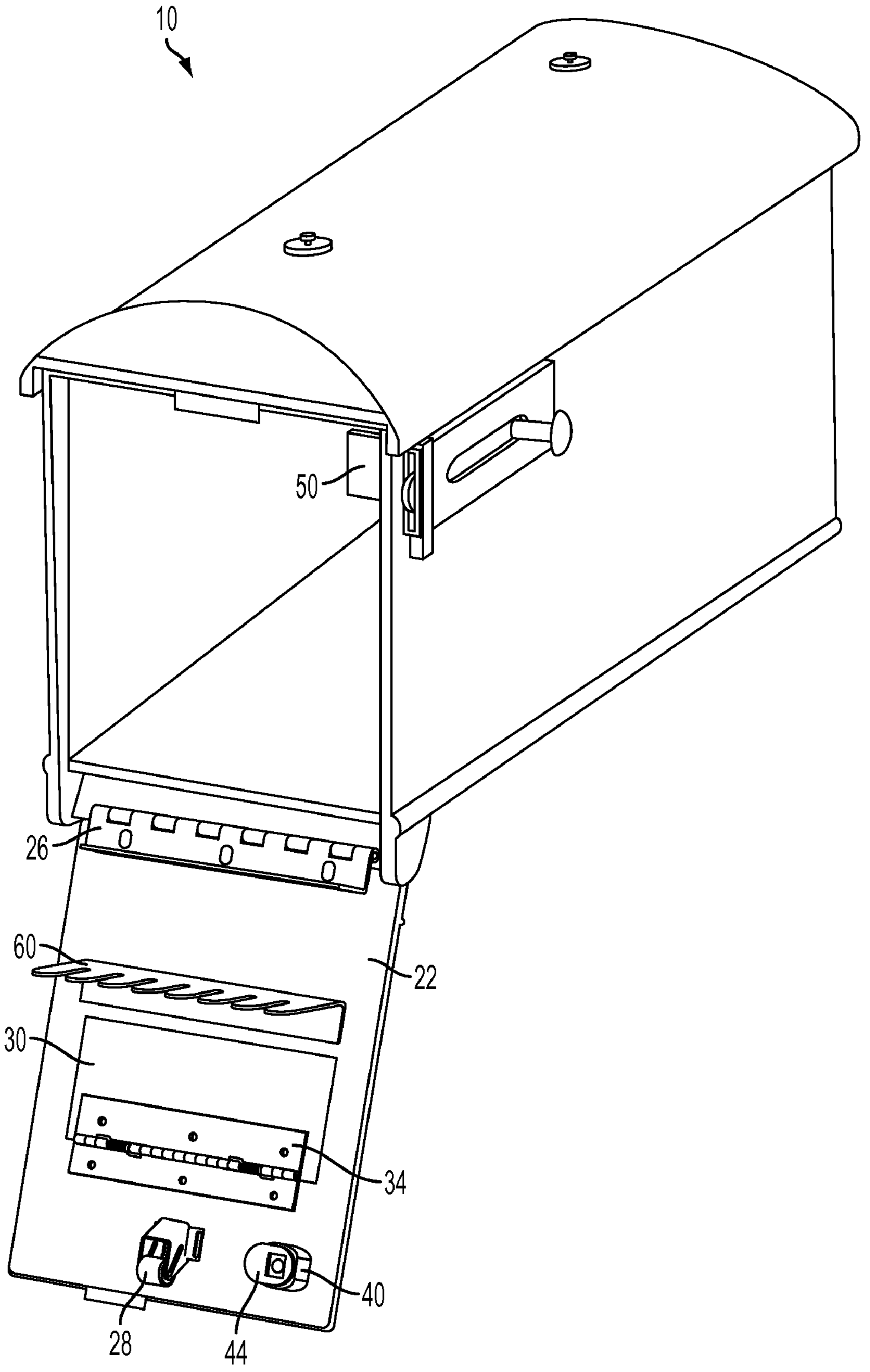
FIG. 6 is a perspective view of the mechanism of FIG. 2 coupled to a pre-existing mailbox, according to one aspect.

In another embodiment, the locking mechanism 20, as assembled above, can be used to retrofit a pre-existing unlocking mailbox 10 and to convert it to a locking mailbox, as illustrated in FIGS. 5 and 6. As can be appreciated, coupling of the locking mechanism to a new mailbox would look similar, if not identical.

In order to retrofit a pre-existing unlocking mailbox, in one aspect, the hinged access door 16 of the existing mailbox can be uncoupled from the existing mailbox. For example, in one aspect, any fasteners, such as screws attaching a hinge of the hinged access door to the housing 18 can be unscrewed, thereby removing the door and leaving a plurality of empty hinge holes in the pre-existing housing. In another aspect, the flag 17 mounted to the outside of the housing can be uncoupled by, for example, removing any fasteners such as screws that attach the flag to the housing, leaving a plurality of empty flag holes in the existing housing.

In this embodiment, the locking mechanism 20 of the current application can be coupled to the pre-existing housing by, for example, fastening the first element 27 of the door hinge 26 to the empty hinge holes of the pre-existing housing with screws, bolts, rivets, and the like. It is also contemplated that the first element of the door hinge can be fixedly attached to the mailbox with other methods, such as, for example and without limitation, welding, adhesives, pressure fitting, and the like. In another aspect, the lock catch 50 can be positioned and fixedly attached to the housing 18 of the mailbox such that the latch 44 of the lock 40 can engage the lock catch 50 and allow the mailbox to be locked when the access door 22 is attached to the mailbox and in the closed position. In another aspect, however, the lock plate 52 can be positioned such that at least one mounting bore of the plurality of mounting bores 54 of the lock plate are substantially co-axially aligned with at least one flag hole of the plurality of empty flag holes of the pre-existing housing when the lock plate is in the desired position. In this aspect, the lock plate 52 can be sized such that, when at least one empty flag hole of the housing 18 is substantially co-axially aligned with at least one mounting bore 54 of the lock plate, the latch 44 of the lock can engage the lock catch 50 when the access door 22 is attached to the housing and in the closed position. Fasteners, such as screws, bolts, and the like, can be inserted therethrough at least one mounting bore of the plurality of mounting bores of the lock plate and the empty flag holes of the pre-existing housing 18 to fixedly attach the lock plate 52 and the flag 17 to the housing. It is also contemplated that the lock plate can be fixedly attached to the housing with other methods, such as, for example and without limitation, welding, adhesives, pressure fitting, and the like.

In one aspect, the components of the locking mechanism 20 and/or the mailbox 10 can be formed from steel. It is contemplated, as can be appreciated by one skilled in the art, that the components of the locking mechanism and/or the mailbox can be formed from other metals, such as, for example and without limitation, aluminum, titanium and the like. It is further contemplated that the components of the locking mechanism and/or the mailbox can be formed from wooden or polymeric materials, including fiber-reinforced polymers, such as, for example and without limitation, fiberglass. It is also contemplated that the locking mechanism and/or the mailbox can be formed from a combination of wooden, metallic and polymeric components.

In order to use the locking mechanism, a user can lock the access door 22 of the mailbox to the housing 18 using a key or other locking method, such as turning the numbers of a combination lock. For example, the proper key can be inserted in the key slot 45 of the lock 40 and rotated in a locking direction, thereby turning the locking tumbler 41 of the lock. This can cause the latch 44 to engage the lock catch 50, thereby locking the access door to the housing. A letter carrier or other person desiring to deposit a letter or other item into the mailbox can push open the mail slot door 30 to expose the mail slot 24 so that a letter or other item can be inserted through the mail slot and into the interior cavity 19 of the housing. The letter or other item can slide over the theft deterrent device 60, if present, and come to rest on the lower surface 12 of the mailbox or on any other item previously inserted into the mailbox. It is of course contemplated that a user can use the locking mechanism 20 disclosed herein without locking the access door 22 and that the appearance of a lock 40 on the access door can itself deter a person for accessing the interior cavity of the mailbox without authorization.

To remove any letters or other items inserted into the mailbox 10, a user can unlock the access door 22 of the mailbox by an appropriate unlocking method, such as rotating the proper key or entering the correct combination. For example, the proper key can be inserted in the key slot of the lock 40 and rotated in an unlocking direction to turn the locking tumbler of the lock causing the latch to disengage the lock catch 50. This unlocks the access door from the housing 18. The access door can be rotated away from the housing and the user can access the interior cavity 19 of the mailbox. In one aspect, the theft deterrent device, if present, can be coupled to the access door such that the theft deterrent device 60 rotates out of the way of the user, thereby reducing the chance that the user could be injured by the plurality of teeth 62 of the theft deterrent device.

If a person desires to remove any letters or other items inserted into the mailbox without unlocking the access door 22, a person can push open the mail slot door 30, thereby exposing the mail slot 24. The person can then insert at least a portion of his hand and/or arm into the mail slot. In one aspect, the mail slot can be small enough to prevent the person from inserting enough of his hand and/or arm into the mailbox to access any letter or other item in the mailbox. In another aspect, the theft deterrent device 60 can be positioned so that if a person inserts his hand and/or arm into the mail slot 24, at least a portion of the plurality of teeth 62 of the theft deterrent device can engage the person's hand and/or arm and deter the person from obtaining the letter or other items in the mailbox.

In one aspect, it is contemplated that the locking mechanism, as described herein, can be supplied to a user, such as, for example and without limitation, the owner of a home having a non-locking mailbox, so that the user can retrofit his non-locking mailbox with the locking mechanism 20 of the current application and convert the non-locking mailbox into a locking mailbox. In another aspect, it is contemplated that the locking mechanism, as described herein, can be coupled to a mailbox to form a locking mailbox assembly before being supplied to a user. In this aspect, the user can install the locking mailbox assembly as a replacement for his existing mailbox or as a new mailbox if there previously was no mailbox present. In still another aspect, it is contemplated that the locking mechanism, as described herein, can be coupled to a sleeve to form a locking mailbox sleeve before being supplied to a user. In this aspect, the user can install the locking mailbox sleeve inside the interior cavity 19 of a pre-existing mailbox with fasteners, adhesives and the like. To access the installed locking mailbox sleeve, the user can open the hinged access door 16 of the pre-existing mailbox 10. The installed locking mailbox sleeve can substantially be a locking mailbox assembly, as described above, positioned within a non-locking mailbox.

It is also contemplated that any of the fasteners described herein, such as screws, bolts, and the like can be replaced with security screws, security bolts, and the like. For example, the second element 29 of the door hinge 26 can be fastened to the access door 22 using a security screw such as a one-way head screw, a protruding obstacle head screw, and the like.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims.

Moreover, although specific terms are employed herein, as well as in the claims that follow, they are used only in a generic and descriptive sense, and not for the purposes of limiting the described invention, nor the claims that follow.

What is claimed is:

1. A locking mechanism for a non-locking pre-existing mailbox having a housing defining an interior cavity accessible through a mailbox opening and a plurality of pre-existing bores, the locking mechanism comprising:

an access door configured to matingly engage the opening, wherein the access door is selectively rotatably movable about and between a closed position, in which the opening of the mailbox is covered, and an open position, in which the opening of the mailbox is not covered, and wherein the access door defines a mail slot extending from a front side of the access door to a rear side of the access door;

a mail slot door configured to matingly engage the mail slot, wherein the mail slot door is selectively rotatably movable about and between a first position, in which the mail slot of the access door is covered, and a second position, in which the mail slot of the access door is not covered;

a locking tumbler attached to the access door, the locking tumbler selectively movable about and between a locked position and an unlocked position;

a latch attached to the locking tumbler;

a lock catch attachable to an inner surface of the housing of the mailbox, wherein movement of the locking tumbler from the unlocked position to the locked position moves the latch to engage the lock catch; and a theft deterrent device coupled to the access door, wherein the theft deterrent device comprises a plurality of teeth extending outwardly away from the rear side of the access door a predetermined distance.

2. The locking mechanism of claim 1, wherein the lock catch comprises a lock plate defining a plurality of mounting bores and sized such that the lock catch is in a desired position when at least two bores of the plurality of mounting bores of the lock plate are substantially co-axially aligned with at least two bores of the plurality of the pre-existing bores in the pre-existing mailbox.

3. The locking mechanism of claim 1, wherein the mail slot door is a self-closing mail slot door.

4. The locking mechanism of claim 3, further comprising a gas spring coupled to the rear side of the access door and a portion of the mail slot door in order to urge the mail slot door into the first position.

5. The locking mechanism of claim 3, further comprising a spring-loaded mail slot hinge coupled to the rear side of the access door and a portion of the mail slot door.

6. A locking mailbox comprising:

a housing defining an interior cavity accessible through a housing opening; and a locking mechanism comprising:

an access door configured to matingly engage the opening, wherein the access door is selectively rotatably movable about and between a closed position, in which the opening of the mailbox is covered, and an open position, in which the opening of the housing is not covered, and wherein the access door defines a mail slot extending from a front side of the access door to a rear side of the access door;

a mail slot door configured to matingly engage the mail slot, wherein the mail slot door is selectively rotatably movable about and between a first position, in which the mail slot of the access door is covered, and a second position, in which the mail slot of the access door is not covered;

means for selectively locking the access door in the closed position; and means for deterring theft coupled to a portion of the rear side of the access door proximate the mail slot comprising a plurality of teeth extending outwardly away from the rear side of the access door a predetermined distance.

7. The locking mailbox of claim 6, wherein the plurality of teeth extend outwardly away from the rear side of the access door at an acute angle relative to the access door.

8. The locking mailbox of claim 6, wherein the plurality of teeth extend outwardly away from the rear side of the access door substantially perpendicular to the access door.

9. The locking mailbox of claim 6, wherein the means for selectively locking the access door in the closed position comprises:

a lock catch coupled to an inner surface of the housing, wherein the lock catch comprises a lock plate defining a plurality of mounting bores and sized such that the lock catch is in a desired position when at least two bores of the plurality of mounting bores of the lock plate are substantially co-axially aligned with at least two bores of a plurality of pre-existing bores in the housing; and a lockable latch coupled to the access door, the lockable latch selectively movable about and between a locked position, in which the latch engages a portion of the lock catch, and an unlocked position, in which the latch does not engage a portion of the lock catch.

10. A method of converting a non-locking mailbox into a locking mailbox, the non-locking mailbox having a housing defining an interior cavity accessible through a mailbox opening and a plurality of pre-existing bores, wherein the mailbox opening is covered by a non-locking mailbox door, the method comprising:

removing the non-locking mailbox door from the non-locking mailbox; and attaching a locking access door to the non-locking mailbox so that the locking access door is selectively rotatably movable about and between a closed position, in which the opening of the mailbox is covered, and an open position, in which the opening of the mailbox is not covered, wherein the locking access door defines a mail slot extending from a front side of the locking access door to a rear side of the locking access door, wherein the locking access door comprises:

a mail slot door configured to matingly engage the mail slot, wherein the mail slot door is selectively rotatably movable about and between a first position, in which the mail slot of the access door is covered, and a second position, in which the mail slot of the access door is not covered;

means for selectively locking the access door in the closed position; and means for deterring theft coupled to a portion of an interior surface of the access door proximate the mail slot, wherein the means for deterring theft comprises a plurality of teeth extending outwardly away from the rear side of the access door.

11. A locking mailbox comprising:

a housing defining an interior cavity accessible through a housing opening; and a locking mechanism comprising:

an access door configured to matingly engage the opening, wherein the access door is selectively rotatably movable about and between a closed position, in which the opening of the mailbox is covered, and an open position, in which the opening of the housing is not covered, and wherein the access door defines a mail slot extending from a front side of the access door to a rear side of the access door;

a mail slot door configured to matingly engage the mail slot, wherein the mail slot door is selectively rotatably movable about and between a first position, in which the mail slot of the access door is covered, and a second position, in which the mail slot of the access door is not covered;

means for selectively locking the access door in the closed position; and a plurality of teeth extending outwardly away from the rear side of the access door a predetermined distance.

* * * * *